(12) United States Patent
Seo et al.

(10) Patent No.: US 12,453,957 B2
(45) Date of Patent: Oct. 28, 2025

(54) PREPARATION METHOD OF SUPER ABSORBENT POLYMER

(71) Applicant: LG Chem, Ltd., Seoul (KR)

(72) Inventors: Jin Seok Seo, Daejeon (KR); Jun Kyu Kim, Daejeon (KR); Dong Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 940 days.

(21) Appl. No.: 17/629,090

(22) PCT Filed: Oct. 7, 2020

(86) PCT No.: PCT/KR2020/013661
§ 371 (c)(1),
(2) Date: Jan. 21, 2022

(87) PCT Pub. No.: WO2021/071246
PCT Pub. Date: Apr. 15, 2021

(65) Prior Publication Data
US 2022/0234027 A1 Jul. 28, 2022

(30) Foreign Application Priority Data
Oct. 7, 2019 (KR) .................. 10-2019-0123772

(51) Int. Cl.
C08J 3/24 (2006.01)
B01J 20/26 (2006.01)
B01J 20/28 (2006.01)
B01J 20/30 (2006.01)
C08F 120/06 (2006.01)

(52) U.S. Cl.
CPC ....... *B01J 20/267* (2013.01); *B01J 20/28016* (2013.01); *B01J 20/3021* (2013.01); *B01J 20/3085* (2013.01); *C08F 120/06* (2013.01); *C08F 2810/20* (2013.01)

(58) Field of Classification Search
None
See application file for complete search history.

(56) References Cited

U.S. PATENT DOCUMENTS

| | | | |
|---|---|---|---|
| 5,672,633 | A | 9/1997 | Brehm et al. |
| 2001/0025093 | A1 | 9/2001 | Ishizaki et al. |
| 2007/0149760 | A1 | 6/2007 | Kadonaga et al. |
| 2011/0237754 | A1 | 9/2011 | Daniel et al. |
| 2013/0098809 | A1 | 4/2013 | Stueven et al. |
| 2013/0123435 | A1* | 5/2013 | Okuda ............. C08J 3/245 525/384 |
| 2014/0058048 | A1 | 2/2014 | Won et al. |
| 2014/0066582 | A1 | 3/2014 | Peterson et al. |
| 2014/0107293 | A1 | 4/2014 | Kadonaga et al. |
| 2014/0350191 | A1 | 11/2014 | Walden et al. |
| 2015/0225514 | A1 | 8/2015 | Kimura et al. |
| 2016/0208022 | A1 | 7/2016 | Kim et al. |
| 2016/0280825 | A1 | 9/2016 | Bauer et al. |
| 2016/0289825 | A1 | 10/2016 | Kim et al. |
| 2016/0367965 | A1 | 12/2016 | Kim et al. |
| 2017/0312148 | A1 | 11/2017 | Dobrosielska-Oura et al. |
| 2018/0044487 | A1 | 2/2018 | Miyajima et al. |
| 2018/0318793 | A1 | 11/2018 | Yoon et al. |
| 2019/0099739 | A1 | 4/2019 | Lee et al. |
| 2019/0125921 | A1 | 5/2019 | Kimura et al. |
| 2019/0135993 | A1 | 5/2019 | Daniel et al. |
| 2020/0009529 | A1 | 1/2020 | Nam et al. |
| 2020/0317872 | A1 | 10/2020 | Wada et al. |
| 2021/0269606 | A1 | 9/2021 | Wakabayashi et al. |

FOREIGN PATENT DOCUMENTS

| | | |
|---|---|---|
| CN | 101100526 A | 1/2008 |
| CN | 102746519 A | 10/2012 |
| CN | 108350189 A | 7/2018 |
| EP | 1800740 A2 | 6/2007 |
| EP | 2927266 A1 | 10/2015 |
| EP | 2471843 B1 | 8/2016 |
| JP | 2009-534482 A | 9/2009 |
| JP | 2010-504211 A | 2/2010 |
| JP | 2010053296 A | 3/2010 |
| JP | 4676625 B2 | 4/2011 |
| JP | 2015-526572 A | 9/2015 |
| KR | 100336706 B1 | 12/2002 |
| KR | 20120054836 A | 5/2012 |
| KR | 20150056572 A | 5/2015 |
| KR | 20150068322 A | 6/2015 |
| KR | 20170127496 A | 11/2017 |

(Continued)

OTHER PUBLICATIONS

Extended European Search Report for Application No. 20875000.0 dated Jul. 11, 2022. 11 pgs.

(Continued)

*Primary Examiner* — Michael J Feely
(74) *Attorney, Agent, or Firm* — Lerner David LLP

(57) ABSTRACT

The present disclosure relates to a preparation method of a super absorbent polymer, and there is provided a preparation method of a super absorbent polymer capable of achieving anti-caking while maintaining excellent absorption-related physical properties of super absorbent polymer particles by performing surface cross-linking at a relatively lower temperature than before using a non-epoxy cross-linking agent without an epoxy-based surface cross-linking agent, which is a controversial source of chemical hazards.

7 Claims, No Drawings

(56) References Cited

FOREIGN PATENT DOCUMENTS

| | | | |
|---|---|---|---|
| KR | 20180040404 A | 4/2018 | |
| KR | 20180074384 A | 7/2018 | |
| KR | 20180127437 A | 11/2018 | |
| WO | 2014032909 A1 | 3/2014 | |
| WO | 2014079694 A1 | 5/2014 | |
| WO | 2015046992 A1 | 4/2015 | |
| WO | 2016062590 A1 | 4/2016 | |
| WO | 2017155197 A1 | 9/2017 | |
| WO | 2017170501 A1 | 10/2017 | |
| WO | 2019221154 A1 | 11/2019 | |

OTHER PUBLICATIONS

International Search Report for PCT/KR2020/013661 dated Feb. 1, 2021. 3 pgs.
Odian, George, "Principle of Polymerization", Second Edition, Wiley-Interscience, (Apr. 1981), 3 pgs.
Schwalm, R., "UV Coatings Basics, Recent Developments and New Application", Elsevier, (Jan. 2007), 3 pgs.
Third Party Observation for Application No. PCT/KR2020/013661 submitted Feb. 4, 2022, 16 pgs.

* cited by examiner

PREPARATION METHOD OF SUPER ABSORBENT POLYMER

CROSS-REFERENCE TO RELATED APPLICATIONS

This application is a national phase entry under 35 U.S.C. § 371 of International Application No. PCT/KR2020/013661, filed on Oct. 7, 2020, which claims priority to Korean Patent Application No. 10-2019-0123772, filed on Oct. 7, 2019, the disclosures of which are incorporated herein by reference in their entirety.

TECHNICAL FIELD

The present disclosure relates to a preparation method of a super absorbent polymer.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

As a preparation method of the super absorbent polymer, a method of suspension polymerization, aqueous solution polymerization, or gas phase polymerization has been known.

The method of aqueous solution polymerization further includes a thermal polymerization in which a polymerization gel is polymerized while being broken and cooled in a kneader equipped with a plurality of shafts, and a photopolymerization in which an aqueous solution at a high concentration is irradiated with UV rays on a belt to be polymerized and dried at the same time.

A hydrogel polymer obtained through the polymerization reaction is generally marketed as a powdery product after drying and pulverization.

In the products made of super absorbent polymers, permeability is an index for determining fluidity of a liquid to be absorbed. The permeability may differ depending on the properties such as particle size distribution of cross-linked polymers, particle shape, and connectedness of open pores between particles, and surface modification of swollen gel. The fluidity of the liquid passing through swollen particles differs depending on permeability of the super absorbent polymer composition. A liquid cannot flow readily through a super absorbent polymer composition with low permeability.

As one of methods for increasing permeability of the super absorbent polymer, there is a method of performing surface cross-linking after polymerization. In this case, a method of adding silica or clay together with a surface cross-linking agent has been used.

However, while permeability is improved by the addition of silica or clay, there are problems that water retention capacity or absorbency under pressure is reduced in proportion thereto, and separation from the super absorbent polymer easily occurs by external physical impact during transport. In particular, when silica or clay is mixed by a wet or dry process, anti-caking property can be obtained, but absorbency under pressure is remarkably reduced. Therefore, it is difficult to achieve rapid absorption performance when practically applied to diapers, etc.

In particular, it is difficult to ensure desired anti-caking effect unless the silica is dry-mixed. Even though a small amount thereof is added, absorption performance under pressure is excessively reduced. There is also a problem that the dry-mixed silica is separated from the super absorbent polymer during transport in a line to generate silica dust.

In addition, recently, hygiene products such as diapers and sanitary napkins have become thinner, so that a method for reducing substances harmful to the human body while achieving higher absorption performance of the super absorbent polymer is emerging as an important issue.

Accordingly, there is a need to develop a super absorbent material which has excellent absorption-related physical properties and excellent anti-caking property to show excellent storage stability under conditions of high temperature and high humidity, while excluding the use of a substance which is a controversial source of chemical hazards.

DETAILED DESCRIPTION OF THE INVENTION

Technical Problem

In the present disclosure, there is provided a preparation method of a super absorbent polymer capable of achieving anti-caking of super absorbent polymer particles while maintaining excellent absorption-related physical properties by performing surface cross-linking at a relatively lower temperature than before using a non-epoxy cross-linking agent without an epoxy-based surface cross-linking agent, which is a controversial source of chemical hazards.

Technical Solution

In the present disclosure, there is provided a preparation method of a super absorbent polymer, including the steps of: forming a hydrogel polymer by cross-linking polymerizing a water-soluble ethylene-based unsaturated monomer having at least partially neutralized acidic groups in the presence of a polymerization initiator and an internal cross-linking agent; drying, pulverizing and classifying the hydrogel polymer to form a base resin powder; and surface cross-linking the base resin powder at a temperature of 170° C. or lower in the presence of a surface cross-linking solution to form super absorbent polymer particles, wherein the surface cross-linking includes a first surface cross-linking performed while raising the temperature from an initial temperature to a first temperature, and a second surface cross-linking performed while lowering the temperature from the first temperature to a second temperature; and the second temperature is lower than the first temperature.

The initial temperature is a temperature before the surface cross-linking reaction of the base resin, and may be about 0 to about 50° C., about 10 to about 30° C., or room temperature.

Herein, the first temperature may be about 165° C. or higher and about 170° C. or lower.

In addition, the second temperature may be about 160° C. or higher and less than about 165° C.

In addition, the first and second surface cross-linking may each independently be performed for about 10 to 60 minutes, about 10 to 40 minutes, or about 10 to 35 minutes.

According to an embodiment of the present disclosure, the surface cross-linking solution may contain a non-epoxy surface cross-linking agent, and on the contrary, it is preferable that it does not contain an epoxy-based surface cross-linking agent.

That is, it may be preferable that the surface cross-linking solution contains only a non-epoxy surface cross-linking agent.

Specifically, the surface cross-linking solution may contain at least one selected from the group consisting of a polyalcohol compound, a polyamine compound, an oxazoline compound, a mono-, di- or polyoxazolidinone compound, a cyclic urea compound, a polyvalent metal salt, and an alkylene carbonate compound.

The surface cross-linking agent may be used in an amount of about 0.5 to 10 parts by weight, preferably about 0.5 to 5 parts by weight, or about 1 to 3 parts by weight based on 100 parts by weight of the base resin powder.

According to an embodiment of the present disclosure, the preparation method may further include a third surface cross-linking performed at a constant temperature of the second temperature after the second surface cross-linking.

The third surface cross-linking may be performed for about 10 to 60 minutes, about 10 to 40 minutes, or about 10 to 20 minutes.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention.

The singular forms are intended to include the plural forms as well, unless the context clearly indicates otherwise.

In the present disclosure, the terms "include", "comprise", or "have" specify the presence of stated features, numbers, steps, components, or combinations thereof, but do not preclude the presence or addition of one or more other features, numbers, steps, components, or combinations thereof.

Also, as used herein, when a layer or an element is mentioned to be formed "on" layers or elements, the layer or element may be directly formed on the layers or elements, or other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, the physiological saline refers to physiological saline (0.9 wt % NaCl(s)).

Hereinafter, the present invention will be described in detail.

According to an embodiment of the present disclosure, there is provided a preparation method of a super absorbent polymer, including the steps of: forming a hydrogel polymer by cross-linking polymerizing a water-soluble ethylene-based unsaturated monomer having at least partially neutralized acidic groups in the presence of a polymerization initiator and an internal cross-linking agent; drying, pulverizing and classifying the hydrogel polymer to form a base resin powder; and surface cross-linking the base resin powder at a temperature of 170° C. or lower in the presence of a surface cross-linking solution to form super absorbent polymer particles, wherein the surface cross-linking includes a first surface cross-linking performed while raising the temperature from an initial temperature to a first temperature, and a second surface cross-linking performed while lowering the temperature from the first temperature to a second temperature; and the first temperature is higher than the initial temperature, and the second temperature is lower than the first temperature.

The present inventors have conducted research on the conventional preparation method of a super absorbent polymer including a surface cross-linking process, especially, a preparation method of a super absorbent polymer capable of achieving anti-caking of the super absorbent polymer while maintaining excellent absorption-related physical properties, despite the use of a non-epoxy surface cross-linking agent. And they have found that a preparation method in which a plurality of surface cross-linking reactions are performed at different temperatures, and particularly, the temperature of surface cross-linking is gradually lowered in the step, while limiting the surface cross-linking agent to a specific material and excluding the use of an epoxy-based surface cross-linking agent satisfies the above conditions, thereby completing the present invention.

Hereinafter, the preparation method of a super absorbent polymer according to an embodiment will be described in more detail for each step.

The "polymer" in the present disclosure is in a state in which a water-soluble ethylene-based unsaturated monomer is polymerized, and may include all moisture content ranges, all particle diameter ranges, all surface cross-linking states, or processing states. Among the polymers, a polymer having a moisture content of about 40 wt % or more which is in a state after polymerization and before drying may be referred to as a hydrogel polymer.

In addition, the base resin refers to a particulate resin or powder obtained by drying and pulverizing the hydrogel polymer, which has not been subjected to additional processes such as surface cross-linking, fine powder reassembly, re-drying, re-pulverization, re-classification, etc.

The term "super absorbent polymer" refers to the polymer itself or the base resin, or includes all the polymers that have been made suitable for commercialization through additional processes such as surface cross-linking, fine powder reassembly, drying, pulverization, classification, etc., depending on the context. Preferably, it may be used to mean a surface cross-linked polymer.

In the preparation method of an embodiment, a hydrogel polymer is first prepared.

The hydrogel polymer may be prepared by polymerizing a monomer mixture containing a water-soluble ethylene-based unsaturated monomer and a polymerization initiator.

The water-soluble ethylene-based unsaturated monomer may be any monomer commonly used in the preparation of a super absorbent polymer. Herein, at least one monomer selected from the group consisting of an anionic monomer and a salt thereof, a nonionic hydrophilic monomer, and an amino-containing unsaturated monomer and a quaternary compound thereof may be used.

Specifically, at least one selected from the group consisting of an anionic monomer of (meth)acrylic acid, maleic anhydride, fumalic acid, crotonic acid, itaconic acid, 2-(meth)acryloylethane sulfonic acid, 2-(meth)acryloylpropane sulfonic acid, or 2-(meth)acrylamide-2-methyl propane sulfonic acid, and a salt thereof; a nonionic hydrophilic monomer of (meth)acrylamide, N-substituted (meth)acrylamide, 2-hydroxyethyl(meth)acrylate, 2-hydroxypropyl (meth)acrylate, methoxypolyethyleneglycol(meth)acrylate, or polyethyleneglycol(meth)acrylate; and an amino-containing unsaturated monomer of (N,N)-dimethylaminoethyl (meth)acrylate or (N,N)-dimethylaminopropyl(meth)acrylamide, and a quaternary compound thereof may be used.

More preferably, acrylic acid or a salt thereof, for example, acrylic acid or an alkali metal salt thereof such as sodium salt, may be used. By using the monomer, it becomes possible to prepare a super absorbent polymer having superior physical properties. When the alkali metal salt of acrylic acid is used as the monomer, it is possible to use acrylic acid after neutralizing the same with a basic compound such as sodium hydroxide (NaOH).

A concentration of the water-soluble ethylene-based unsaturated monomer may be about 20 to 60 wt %, or about 40 to 50 wt % based on the monomer composition containing the raw materials of the super absorbent polymer and a solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

In the preparation method of a super absorbent polymer according to an embodiment, the polymerization initiator used during polymerization is not particularly limited as long as it is generally used in the preparation of a super absorbent polymer.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

A concentration of the photopolymerization initiator in the monomer mixture may be about 0.01 to about 1.0 wt %. When the concentration of the photopolymerization initiator is excessively low, the polymerization rate may become slow, and when the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

A concentration of the thermal polymerization initiator included in the monomer mixture may be 0.001 to 0.5 wt %. When the concentration of the thermal polymerization initiator is excessively low, additional thermal polymerization hardly occurs and there may be less effect of adding the thermal polymerization initiator. When the concentration of the thermal polymerization initiator is excessively high, the molecular weight of the super absorbent polymer may become low and the properties may be uneven.

According to an embodiment, the monomer mixture may further include an internal cross-linking agent as a raw material of the super absorbent polymer. The internal cross-linking agent may be a cross-linking agent having one or more ethylene-based unsaturated groups in addition to the functional group which may react with the water-soluble substituents of the water-soluble ethylene-based unsaturated monomer; or a cross-linking agent having two or more functional groups which may react with the water-soluble substituents of the monomer and/or the water-soluble substituents formed by hydrolysis of the monomer.

As the specific example of the internal cross-linking agent, a C8-C12 bisacrylamide, bismethacrylamide, a poly(meth)acrylate of C2-C10 polyol, a poly(meth)allylether of C2-C10 polyol, or the like may be used. More specifically, one or more agents selected from the group consisting of N,N'-methylenebis(meth)acrylate, ethyleneoxy(meth)acrylate, polyethyleneoxy(meth)acrylate, propyleneoxy(meth)acrylate, glycerin diaciylate, glycerin triacrylate, trimethylol triacrylate, triallylamine, triarylcyanurate, triallylisocyanate, polyethyleneglycol, diethyleneglycol, and propyleneglycol may be used.

This internal cross-linking agent may be included at a concentration of 0.01 to 0.5 wt % based on the monomer mixture, so that the polymerized polymer can be cross-linked.

In the preparation method according to an embodiment, the monomer mixture of the super absorbent polymer may further include a thickener, a plasticizer, a preservation stabilizer, an antioxidant, or the like, if necessary.

The raw materials such as the water-soluble ethylene-based unsaturated monomer, the photopolymerization initiator, the thermal polymerization initiator, the internal cross-linking agent, and the additive may be prepared in the form of a monomer mixture solution dissolved in a solvent.

At this time, any solvent which can dissolve the components may be used without limitation, and for example, one or more solvents selected from water, ethanol, ethylenegly-col, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used alone or in combination.

The solvent may be included in the monomer mixture at a residual quantity except for the above components.

Meanwhile, the method of preparing the hydrogel polymer by polymerizing the monomer mixture is not particularly limited if it is a common polymerization method for preparing a super absorbent polymer.

Specifically, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer mixture to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of 0.5 to 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Generally, the moisture content of the hydrogel polymer obtained by the above method may be 40 to 80 wt %. At this time, "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

According to an embodiment, a coarse pulverization process may be selectively performed on the hydrogel polymer obtained above.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverization step, the hydrogel polymer may be pulverized to have a diameter of about 2 to 20 mm.

It is technically difficult to coarsely pulverize the hydrogel polymer to have a diameter of less than 2 mm because of its high moisture content, and there may be a phenomenon that the pulverized particles cohere with each other. Meanwhile, when the polymer is coarsely pulverized to have a diameter of larger than 20 mm, the efficiency enhancing effect in the subsequent drying step may be low.

In the preparation method of a super absorbent polymer according to an embodiment, the obtained hydrogel polymer may optionally be dried and pulverized, and then classified into fines and normal particles.

The drying process is performed on the hydrogel polymer, which is coarsely pulverized, or immediately after polymerization and not subjected to a coarse pulverization step. At this time, the drying temperature of the drying step may be about 150 to about 250° C. When the drying temperature is lower than about 150° C., the drying time may become excessively long and the properties of the super absorbent polymer finally prepared may decrease. And when the drying temperature is higher than about 250° C., the surface of the polymer is excessively dried, a large amount of fines may be generated, and properties of the super absorbent polymer finally prepared may decrease. Therefore, the drying process may preferably be carried out at a temperature of about 150 to about 200° C., more preferably at a temperature of about 160 to about 180° C.

Furthermore, the drying time may be about 20 to about 90 minutes in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %.

Subsequently, a pulverization process is performed on the dried polymer obtained from the drying step.

The polymer powder obtained after the pulverization step may have a diameter of 150 to 850 µm. In order to pulverize the polymer into such diameter, a pin mill, a hammer mill, a screw mill, a roll mill, a disc mill, or a jog mill may be used as the pulverizing machine, but the present disclosure is not limited thereto.

In order to control the properties of the super absorbent polymer powder which is finally commercialized after the pulverization step, the polymer powder obtained after pulverization is generally classified according to the particle diameter. Preferably, a step of classifying the polymer powder into particles having a particle diameter of 150 cm or less and particles having a particle diameter of more than about 150 cm and 850 cm or less is performed.

The "particle diameter or particle size" may be measured by a standard sieve analysis or a laser diffraction method, preferably by a standard sieve analysis, unless otherwise specified herein. The "average particle diameter or weight average particle diameter" may mean a particle diameter (D50) at 50% of the weight percentage in the particle size distribution curve obtained by laser diffraction.

In the present disclosure, fine particles having a particle diameter of a predetermined particle size or less, i.e., about 150 cm or less, are referred to as a base resin fine powder, a super absorbent polymer fine powder, a SAP fine powder or a fine powder (fines), and particles having a particle diameter of more than 150 cm and 850 f CM or less are referred to as normal particles.

The fines may be generated during the polymerization process, the drying process, or the pulverization step of the dried polymer. When the fines are included in final products, it is difficult to handle, and physical properties may be deteriorated, for example, gel blocking phenomenon may occur. Therefore, it is preferable to exclude the fines from the final products, or to reassemble the fines to normal particles.

For example, a reassembly process in which the fines are aggregated to have a normal particle size may be performed. In general, in order to increase cohesive strength in the reassembly process, the fines are aggregated in a wet state. If the moisture content of the fines is increased, cohesive strength of the fines increases, but a reassembled mass may be generated in the reassembly process, which may cause problems during operation of the process. If the moisture content is reduced, the reassembly process is easy, but cohesive strength of the reassembly is not sufficient, which may cause a generation of re-fines after reassembly. In addition, the fine powder reassembly obtained in this way has lower physical properties such as centrifuge retention capacity (CRC) and absorbency under pressure (AUP) than normal particles, which may lead to a decrease in the quality of the super absorbent polymer.

Therefore, in preparation method of an embodiment, water and additives are optionally added to the fines and re-assembled to obtain a fine powder reassembly.

In the preparation step of the fine powder reassembly, the fines and the aqueous additive solution may be mixed by stirring at about 10 to 2000 rpm, about 100 to 1000 rpm or about 500 to 800 rpm with a mixing device or mixer capable of applying a shear force.

For example, the drying process may be performed at about 120 to 220° C. to form a fine powder reassembly with improved cohesive strength through covalent bonding, and the moisture content of the fine powder reassembly may be adjusted to about 1 to 2 wt % within a suitable time.

The drying process may be performed using a conventional drying device, but according to an embodiment of the present disclosure, it may be performed using a hot air dryer, a paddle-type dryer, or a forced circulation-type dryer. The heating means for drying in the drying process is not particularly limited. Specifically, it is possible to provide a thermal media or provide a heat source such as electricity thereto for direct heating, but the present disclosure is not limited thereto. Examples of the usable heat source may include steam, electricity, ultraviolet rays, infrared rays, heated thermal fluids, and the like.

Subsequently, in the preparation method of a super absorbent polymer according to an embodiment of the present disclosure, the fine powder reassembly obtained in the above step is pulverized, if necessary, and classified into reassembly fines (hereinafter referred to as 're-fines') and reassembly normal particles.

The fine powder reassembly obtained in the preparation step of a fine powder reassembly has high cohesive strength, thereby having a low proportion at which the fine particles are re-crushed again into fines after the pulverization step, that is, a low proportion of formation of re-fines.

The fine powder reassembly may be pulverized to have a particle diameter of about 150 to about 850 cm. In order to pulverize the fine powder reassembly into such diameter, a pin mill, a hammer mill, a screw mill, a roll mill, a disc mill, or a jog mill may be used as the pulverizing machine, but the present disclosure is not limited thereto.

In order to manage physical properties of the super absorbent polymer powder to be commercialized after the pulverization step, the polymer powder obtained after pulverization is generally classified according to the particle diameter. Preferably, the polymer powder is classified into re-fines having a particle diameter of 150 cm or less and reassembly normal particles having a particle diameter of more than 150 cm and 850 cm or less.

In addition, the preparation method for a super absorbent polymer according to an embodiment of the present disclosure includes a step of surface cross-linking the base resin powder, or optionally the base resin powder including the fine powder reassembly in the presence of a surface cross-linking solution at a temperature of 170° C. or lower to form super absorbent polymer particles.

The surface cross-linking is a step of increasing a cross-linking density near the surface of super absorbent polymer particles with regard to a cross-linking density inside the particles. Generally, surface cross-linking agents are applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

At this time, the surface cross-linking includes a first surface cross-linking performed while raising the temperature from an initial temperature to a first temperature, and a second surface cross-linking performed while lowering the temperature from the first temperature to a second temperature, wherein the second temperature is controlled to be lower than the first temperature.

In the conventional surface cross-linking process, the surface cross-linking reaction is performed while the temperature is constantly maintained at a high temperature, or the surface cross-linking reaction is performed while increasing the temperature. On the other hand, since the present disclosure performs the first surface cross-linking reaction at a relatively high temperature and the second surface cross-linking reaction at a lower temperature, anti-caking of the super absorbent polymer can be achieved while maintaining excellent absorption-related physical properties of the super absorbent polymer despite the use of a non-epoxy surface cross-linking agent.

In this case, the first temperature may be preferably about 165° C. or higher and about 170° C. or lower.

In addition, the second temperature may be preferably about 160° C. or higher and less than about 165° C.

If the surface cross-linking temperature is too high out of the above temperature range, or if the temperature is not lowered in an appropriate time, CRC of the super absorbent polymer to be prepared may be decreased, and if the temperature range is too low, effective absorption capacity may be lowered.

In addition, it may be preferable that the first and second surface cross-linking are each independently performed for about 10 to 60 minutes.

If the surface cross-linking is performed too short, the surface cross-linked layer is not properly formed in the super absorbent polymer to be prepared, which may cause a decrease in absorption-related overall physical properties. If the surface cross-linking is performed too long, a caking phenomenon may occur in the super absorbent polymer to be prepared.

According to an embodiment of the present disclosure, the surface cross-linking solution may contain a non-epoxy surface cross-linking agent. On the contrary, it is preferable that it does not contain an epoxy-based surface cross-linking agent, which is a controversial source of chemical hazards.

Herein, the surface cross-linking agent is a compound capable of reacting with a functional group of the polymer, and it is not particularly limited as long as it is a non-epoxy surface cross-linking agent that does not contain an epoxy group in the molecule.

Preferably, in order to improve the properties of the super absorbent polymer to be prepared, at least one selected from the group consisting of a polyalcohol compound; a polyamine compound; an oxazoline compound; a mono-, di- or polyoxazolidinone compound; a cyclic urea compound; a polyvalent metal salt; and an alkylene carbonate compound may be used as the surface cross-linking agent.

Specific examples of the polyalcohol compound may include one or more selected from the group consisting of mono-, di-, tri-, tetra- or polyethylene glycol, monopropylene glycol, dipropylene glycol, polypropylene glycol, 2,3, 4-trimethyl-1,3-pentanediol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the alkylene carbonate-based compound may include ethylene carbonate, and the like. These may be used alone or in combination with each other. Meanwhile, to increase the efficiency of the surface cross-linking process, it is preferable to use one or more of the polyalcohol compound among these surface cross-linking agents. More preferably, polyalcohol compounds having 2 to 10 carbon atoms may be used.

The amount of the surface cross-linking agent added may be appropriately selected depending on the kind of the surface cross-linking agent added or the reaction conditions. However, the surface cross-linking agent may be generally used in an amount of about 0.5 to about 10 parts by weight, preferably about 0.5 to about 5 parts by weight, and more preferably about 1 to about 3 parts by weight, based on 100 parts by weight of the polymer.

If the amount of the surface cross-linking agent is excessively small, the surface cross-linking reaction hardly occurs, and if the amount of the surface cross-linking agent is excessively large, absorption performance and physical properties may be decreased due to excessive surface cross-linking reaction.

The surface cross-linking reaction and the drying process may be carried out simultaneously by heating the polymer particles to which the surface cross-linking agent is added.

The means for controlling the temperature for the surface cross-linking reaction is not particularly limited. For example, it is possible to provide a thermal media or a heat source directly to the reaction system. The temperature may be decreased or increased by controlling the amount of heat supplied.

At this time, usable thermal media may be a heated fluid such as steam, hot air, hot oil, etc., and a cooled fluid such as cold air, cold oil, etc., but the present disclosure is not limited thereto. Furthermore, the temperature of the thermal media provided thereto may be properly selected in consideration of the means of the thermal media, heating and cooling speed, target temperature of heating and cooling, etc. Meanwhile, an electric heater or a gas heater may be used as the heat source provided directly, but the present disclosure is not limited thereto.

In addition, according to an embodiment of the present disclosure, a third surface cross-linking performed at a constant temperature of the second temperature may be further included after the second surface cross-linking.

The third surface cross-linking may be performed for about 10 to about 60 minutes, about 10 to about 40 minutes, or about 10 minutes to about 20 minutes.

With the third surface cross-linking, absorption-related overall physical properties may be improved and an anti-caking effect may be more excellently achieved in the super absorbent polymer to be prepared.

In addition, after the surface cross-linking, it may be classified into surface cross-linked fines having a particle diameter of 150 cm or less and surface cross-linked normal particles having a particle diameter of more than 150 cm and 850 cm or less. Thereafter, the surface cross-linked fines having a particle diameter of 150 cm or less may be re-put into a fine reassembly process, and the surface cross-linked normal particles may be commercialized and used as products.

Advantageous Effects

The preparation method of a super absorbent polymer according to an embodiment of the present disclosure can achieve anti-caking while maintaining excellent absorption-related physical properties of super absorbent polymer particles by performing surface cross-linking at a relatively lower temperature than before using a non-epoxy cross-linking agent without an epoxy-based surface cross-linking agent, which is a controversial source of chemical hazards.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Preparation of Base Resin—Examples and Comparative Examples

A monomer composition was prepared by mixing 100 parts by weight of acrylic acid, 126.8 parts by weight of 31.5% caustic soda (NaOH), 46 parts by weight of water, and the following components.

Internal cross-linking agent: 0.2 parts by weight (2000 ppmw) of polyethylene glycol diacrylate (PEGDA; Mw=400)

Polymerization initiator: 0.008 parts by weight (80 ppmw) of bis(2,4,6-trimethylbenzoyl)phenylphosphine oxide (photoinitiator) and 0.12 parts by weight (1200 ppmw) of sodium persulfate (thermal initiator)

Then, the monomer composition was introduced into a supply unit of a polymerization reactor having a continuously moving conveyor belt, and irradiated with ultraviolet rays (about 2 mW/cm$^2$) for 1.5 minutes with a UV irradiation device, followed by polymerization, thereby obtaining a hydrogel polymer as a product.

The hydrogel polymer was cut with a cutter. Then, the hydrogel polymer was dried in a hot air dryer at 190° C. for 40 minutes, and the dried hydrogel polymer was pulverized with a pulverizing machine. Then, the polymer having a particle size (average particle size) of 150 μm to 850 μm was classified using a sieve to obtain fines and normal particles of the base resin.

The CRC value of the obtained base resin was about 54 g/g.

Surface Cross-Linking

Example 1

A base resin having the following particle size distribution was prepared with the base resin prepared above and a standard sieve.

20-#30: 22 wt %, #30-#50: 64 wt %, #50-#100: 13 wt %, #100: 1 wt %

A surface cross-linking solution was prepared by mixing about 5.4 parts by weight of water, about 1.8 parts by weight of ethylene carbonate and propylene carbonate (1:1), about 0.58 parts by weight of propylene glycol, and 0.24 parts by weight of aluminum sulfate based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 168° C. over about 30 minutes (first surface cross-linking).

Thereafter, a surface cross-linking reaction was performed while lowering the temperature of the reaction system to about 163° C. over about 15 minutes (second surface cross-linking).

Thereafter, a surface cross-linking reaction was performed while adjusting the temperature of the reaction system to about 163° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 μm was obtained using a sieve.

Example 2

A base resin having the following particle size distribution was prepared with the base resin prepared above and a standard sieve.

20-#30: 22 wt %, #30-#50: 64 wt %, #50-#100: 13 wt %, #100: 1 wt %

A surface cross-linking solution was prepared by mixing about 5.4 parts by weight of water, about 1.8 parts by weight of ethylene carbonate and propylene carbonate (1:1), about 0.58 parts by weight of propylene glycol, and 0.24 parts by weight of aluminum sulfate based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 170° C. over about 30 minutes (first surface cross-linking).

Thereafter, a surface cross-linking reaction was performed while lowering the temperature of the reaction system to about 160° C. over about 15 minutes (second surface cross-linking).

Thereafter, a surface cross-linking reaction was performed while adjusting the temperature of the reaction system to about 160° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 cm was obtained using a sieve.

Comparative Example 1

A surface cross-linking solution was prepared by mixing about 3.2 parts by weight of water, about 4.5 parts by weight of methanol, and about 0.132 parts by weight of ethylene glycol based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 163° C. over about 30 minutes (first surface cross-linking).

Thereafter, a surface cross-linking reaction was performed while raising the temperature of the reaction system to about 183° C. over about 15 minutes (second surface cross-linking).

Thereafter, a surface cross-linking reaction was performed while adjusting the temperature of the reaction system to about 185° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 cm was obtained using a sieve.

Comparative Example 2

A surface cross-linking solution was prepared by mixing about 5.4 parts by weight of water, about 1.8 parts by weight of ethylene carbonate and propylene carbonate (ECPC), and about 0.58 parts by weight of propylene glycol based on 100 parts by weight of the base resin prepared above.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 163° C. over about 30 minutes (first surface cross-linking).

Thereafter, a surface cross-linking reaction was performed while raising the temperature of the reaction system to about 183° C. over about 15 minutes (second surface cross-linking).

Thereafter, a surface cross-linking reaction was performed while adjusting the temperature of the reaction system to about 185° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 μm was obtained using a sieve.

Comparative Example 3

A surface cross-linking solution was prepared by mixing about 3.2 parts by weight of water, about 4.5 parts by weight of methanol, and about 0.132 parts by weight of ethylene glycol based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 163° C. over about 30 minutes (first surface cross-linking).

Thereafter, a surface cross-linking reaction was performed while raising the temperature of the reaction system to about 183° C. over about 15 minutes (second surface cross-linking).

Thereafter, a surface cross-linking reaction was performed while raising the temperature of the reaction system to about 185° C. over about 15 minutes (third surface cross-linking).

About 0.05 parts by weight of a post-added inorganic filler (Aerosil 200, manufactured by Evonik) was added to 100 parts by weight of the super absorbent polymer obtained after completion of the surface cross-linking, and mixed well.

This was put into a pulverizing machine and pulverized, and then a surface-treated super absorbent polymer having a particle diameter of 150 to 850 μm was obtained using a sieve.

Comparative Example 4

A surface cross-linking solution was prepared by mixing about 3.2 parts by weight of water, about 4.5 parts by weight of methanol, and about 0.132 parts by weight of ethylene glycol based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 163° C. over about 30 minutes (first surface cross-linking).

Thereafter, a surface cross-linking reaction was performed while adjusting the temperature of the reaction system to about 163° C. and maintaining it for about 15 minutes (second surface cross-linking).

Thereafter, a surface cross-linking reaction was performed while raising the temperature of the reaction system to about 168° C. over about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 μm was obtained using a sieve.

Comparative Example 5

A base resin having the following particle size distribution was prepared with the base resin prepared above and a standard sieve.

20-#30: 22 wt %, #30-#50: 64 wt %, #50-#100: 13 wt %, #100: 1 wt %

A surface cross-linking solution was prepared by mixing about 5.4 parts by weight of water, about 1.8 parts by weight of ethylene carbonate and propylene carbonate (1:1), about 0.58 parts by weight of propylene glycol, and 0.24 parts by weight of aluminum sulfate based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 165° C. over about 30 minutes (first surface cross-linking).

Thereafter, a surface cross-linking reaction was performed while lowering the temperature of the reaction system to about 150° C. over about 15 minutes (second surface cross-linking).

Thereafter, a surface cross-linking reaction was performed while adjusting the temperature of the reaction system to about 150° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 μm was obtained using a sieve.

Comparative Example 6

A base resin having the following particle size distribution was prepared with the base resin prepared above and a standard sieve.

20-#30: 22 wt %, #30-#50: 64 wt %, #50-#100: 13 wt %, #100: 1 wt %

A surface cross-linking solution was prepared by mixing about 5.4 parts by weight of water, about 1.8 parts by weight of ethylene carbonate and propylene carbonate (1:1), about 0.58 parts by weight of propylene glycol, and 0.24 parts by weight of aluminum sulfate based on 100 parts by weight of the base resin.

The surface cross-linking solution was added to 100 parts by weight of the base resin powder, and mixed well with stirring at about 1000 rpm for about 30 seconds using a mixer.

This was put into a reactor, and subjected to a surface cross-linking reaction while raising the temperature to about 165° C. over about 30 minutes (first surface cross-linking).

Thereafter, a surface cross-linking reaction was performed while lowering the temperature of the reaction system to about 60° C. over about 15 minutes (second surface cross-linking).

Thereafter, a surface cross-linking reaction was performed while adjusting the temperature of the reaction system to about 60° C. and maintaining it for about 15 minutes (third surface cross-linking).

The super absorbent polymer obtained after completion of the surface cross-linking was put into a pulverizing machine and pulverized, and then a surface-treated super absorbent polymer having a particle diameter of 150 to 850 μm was obtained using a sieve.

Evaluation of Physical Properties

Absorption-related physical properties of the super absorbent polymer obtained above were measured by the following method.

CRC Measurement

The centrifuge retention capacity by absorption ratio under a non-loading condition of each polymer was measured in accordance with EDANA WSP 241.3.

Specifically, a polymer was obtained by classifying the super absorbent polymer prepared in one of Examples and Comparative Examples through a sieve of #30-50. After inserting W0 (g, about 0.2 g) of the polymer uniformly in a nonwoven fabric envelope and sealing the same, it was soaked in physiological saline (0.9 wt %) at room temperature. After 30 minutes, the envelope was centrifuged at 250 G for 3 minutes to drain, and the weight W2 (g) of the envelope was measured. Further, after carrying out the same operation without using the polymer, the weight W1 (g) of the envelope was measured. Then, CRC (g/g) was calculated using the obtained weight values according to the following Equation.

CRC (g/g)={[W2(g)−W1(g)]/W0(g)}−1      [Equation 1]

0.7 AUP Measurement

The absorbency under pressure at 0.7 psi of each polymer was measured in accordance with EDANA WSP 242.3.

First, in the measurement of the absorbency under pressure, the classified polymer in the above CRC measurement was used.

Specifically, a 400 mesh stainless steel screen was installed in a cylindrical bottom of a plastic having an inner diameter of 25 mm. W0 (0.16 g) of the super absorbent polymer was uniformly scattered on the screen at room temperature and a humidity of 50%. Thereafter, a piston which can uniformly provide a load of 0.7 psi (or 0.3, 0.9 psi) was placed on the composition. Herein, the outer diameter of the piston was slightly smaller than 25 mm, there was no gap with the inner wall of the cylinder, and jig-jog of the cylinder was not interrupted. At this time, the weight W3 (g) of the device was measured.

Subsequently, a glass filter having a diameter of 90 mm and a thickness of 5 mm was placed in a petri dish having a diameter of 150 mm, and physiological saline (0.9 wt % sodium chloride) was poured in the dish. At this time, the physiological saline was poured until the surface level of the physiological saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight W4 (g) was measured.

Then, absorbency under pressure (g/g) was calculated using the obtained weight values according to the following Equation.

AUP(g/g)=[W4(g)−W3(g)]/W0(g)      [Equation 2]

The arithmetic mean of the measured CRC and 0.7 AUP was obtained, and summarized as effective absorption capacity.

Measurement of Anti-Caking Property 2 g (W5) of the super absorbent polymer prepared in one of Examples and Comparative Examples was evenly applied to a 9 cm-diameter petri dish, and then left for 10 minutes in a constant temperature and humidity chamber maintaining a temperature of 40±3° C., and a humidity of 80±3%. Thereafter, the flask dish was turned over on a filter paper and taped three times, and then the amount of super absorbent polymer falling off (W6) was measured.

The anti-caking efficiency was calculated using the obtained weight values according to the following Equation 3. The higher the value is, the better the anti-caking efficiency is.

Anti-caking efficiency (%)=[W6(g)/W5(g)]*100      [Equation 3]

In Equation 3, W5 (g) is an initial weight (g) of super absorbent polymer, and W6 (g) is an amount of super absorbent polymer falling off after applying the super absorbent polymer evenly to a 10 cm-diameter flask dish, maintaining it for 10 minutes in a constant temperature and humidity chamber of 40±3° C. and 80±3%, and then turning the flask dish over on a filter paper, followed by tapping 3 times.

The measured values are summarized in Table 1 below.

TABLE 1

| | CRC (g/g) | 0.7 AUP (g/g) | Effective absorption capacity (g/g) | Anti-caking (%) |
|---|---|---|---|---|
| Comp. Ex. 1 | 36.6 | 22.7 | 29.6 | 0 |
| Comp. Ex. 2 | 33.5 | 22.9 | 28.2 | 0 |
| Comp. Ex. 3 | 36.3 | 20.4 | 28.9 | 80 |
| Comp. Ex. 4 | 41.5 | 12.5 | 27.0 | 0 |
| Comp. Ex. 5 | 44.3 | 11.0 | 27.8 | 85 |
| Comp. Ex. 6 | 45.5 | 9.5 | 27.5 | 85 |
| Ex. 1 | 40.8 | 20.4 | 30.6 | 90 |
| Ex. 2 | 41.5 | 19.1 | 30.3 | 90 |

Referring to Table 1, although the super absorbent polymer prepared according to an embodiment of the present disclosure was prepared by surface cross-linking at a relatively lower temperature than before, both CRC and 0.7 AUP were excellent, and thus excellent effective absorption capacity could be maintained with very high anti-caking efficiency.

The invention claimed is:

1. A preparation method of a super absorbent polymer, comprising:
   forming a hydrogel polymer by cross-linking polymerization of a water-soluble ethylene-based unsaturated monomer having at least partially neutralized acidic groups in the presence of a polymerization initiator and an internal cross-linking agent;
   drying, pulverizing and classifying the hydrogel polymer to form a base resin powder; and
   surface cross-linking the base resin powder at a temperature of 170° C. or lower in the presence of a surface cross-linking solution to form super absorbent polymer particles,
   wherein the surface cross-linking comprises a first surface cross-linking performed for 10 to 60 minutes while raising the temperature from an initial temperature to a first temperature, and a second surface cross-linking performed for 10 to 60 minutes while lowering the temperature from the first temperature to a second temperature;
   wherein the first temperature is higher than the initial temperature but not higher than 170° C., the second temperature is lower than the first temperature, and the second temperature is 160° C. or higher and less than 165° C.

2. The preparation method of a super absorbent polymer of claim 1, wherein the first temperature is 165° C. or higher and 170° C. or lower.

3. The preparation method of a super absorbent polymer of claim 1, wherein the first and second surface cross-linking are each independently performed for 10 to 40 minutes.

4. The preparation method of a super absorbent polymer of claim 1, wherein the surface cross-linking solution contains a non-epoxy surface cross-linking agent.

5. The preparation method of a super absorbent polymer of claim 1, wherein the surface cross-linking solution contains at least one of: a polyalcohol compound, a polyamine compound, an oxazoline compound, a mono-oxazolidinone compound, a di-oxazolidinone compound, a polyoxazolidinone compound, a cyclic urea compound, a polyvalent metal salt, and an alkylene carbonate compound.

6. The preparation method of a super absorbent polymer of claim 1, wherein the surface cross-linking solution contains a surface cross-linking agent provided in an amount of 0.5 to 10 parts by weight based on 100 parts by weight of the base resin powder.

7. The preparation method of a super absorbent polymer of claim 1, further comprising a third surface cross-linking performed at a constant temperature of the second temperature after the second surface cross-linking.

\* \* \* \* \*